(12) United States Patent
Shimokodachi et al.

(10) Patent No.: US 9,781,289 B2
(45) Date of Patent: Oct. 3, 2017

(54) IMAGE PROCESSING APPARATUS, METHOD, AND STORAGE MEDIUM STORING PROGRAM

(71) Applicant: CANON KABUSHIKI KAISHA, Tokyo (JP)

(72) Inventors: Yumi Shimokodachi, Kawasaki (JP); Hajime Nagai, Kawasaki (JP); Yoshinori Nakajima, Yokohama (JP); Hiroyuki Sakai, Chigasaki (JP); Naoya Takesue, Tokyo (JP); Tomokazu Yanai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/154,807

(22) Filed: May 13, 2016

(65) Prior Publication Data

US 2016/0352956 A1    Dec. 1, 2016

(30) Foreign Application Priority Data

May 29, 2015    (JP) .................................. 2015-110799

(51) Int. Cl.
*H04N 1/04*    (2006.01)
*H04N 1/00*    (2006.01)
*G06K 15/10*    (2006.01)

(52) U.S. Cl.
CPC ............ *H04N 1/04* (2013.01); *G06K 15/102* (2013.01); *H04N 1/00795* (2013.01); *H04N 2201/0094* (2013.01)

(58) Field of Classification Search
CPC ............... G06K 15/181; G06K 15/022; G06K 15/1802; G06K 15/1832; G06K 15/1851; G06K 15/1865; G06F 17/30153; G06F 3/1213; G06F 3/1215; G06F 3/1245; G06F 3/1276; G06F 3/1285
USPC .............. 358/1.16, 444, 1.13, 448, 468, 1.9; 348/207.1, 207.2, 254
See application file for complete search history.

(56) References Cited

U.S. PATENT DOCUMENTS

| | | | |
|---|---|---|---|
| 6,198,494 B1 * | 3/2001 | Haraguchi | H04N 1/506 347/232 |
| 6,530,639 B1 * | 3/2003 | Matsuda | B41J 29/393 347/15 |
| 6,647,133 B1 * | 11/2003 | Morita | G06K 9/00013 340/562 |
| 6,906,813 B1 | 6/2005 | Tuchitoi et al. | |
| 6,919,972 B2 | 7/2005 | Kumada et al. | |
| 7,130,460 B2 | 10/2006 | Nakazawa et al. | |

(Continued)

FOREIGN PATENT DOCUMENTS

| | | |
|---|---|---|
| JP | 2003-153865 A | 5/2003 |
| JP | 2010-155390 A | 7/2010 |

OTHER PUBLICATIONS

Tezuka, K., et al. "Digital Image Processing Engineering", 1st impression of 1st edition, Nikkan Kogyo Shimbun, Jun. 15, 1985, pp. 54-57.

*Primary Examiner* — Negussie Worku
(74) *Attorney, Agent, or Firm* — Fitzpatrick, Cella, Harper & Scinto

(57) ABSTRACT

Image data is processed using a filter configured to compensate for degradation in an image that occurs when the image is printed by a printing unit. The degree of compensation for the degradation in the image by the filter depends on a printing direction on a printing medium by the printing unit.

22 Claims, 12 Drawing Sheets

(56) References Cited

U.S. PATENT DOCUMENTS

| | | | |
|---|---|---|---|
| 7,256,906 B2 | 8/2007 | Nakajima | |
| 7,336,387 B2 * | 2/2008 | Nakami | H04N 1/00249 |
| | | | 358/1.16 |
| 7,929,173 B2 | 4/2011 | Tuchitoi et al. | |
| 8,520,248 B2 * | 8/2013 | Ishizaka | G06K 15/02 |
| | | | 347/1 |
| 9,296,225 B2 | 3/2016 | Yanai et al. | |
| 9,361,559 B2 * | 6/2016 | Shibata | H04N 1/52 |
| 9,411,544 B2 * | 8/2016 | Miyake | G06F 3/1208 |
| 9,636,837 B2 * | 5/2017 | Kandemir | B26D 7/204 |
| 2003/0076523 A1 | 4/2003 | Ito et al. | |
| 2003/0151667 A1 * | 8/2003 | Nakami | H04N 1/00249 |
| | | | 348/207.1 |
| 2005/0280877 A1 * | 12/2005 | Watanabe | H04N 1/00127 |
| | | | 358/448 |
| 2008/0286442 A1 * | 11/2008 | Ushiyama | H01L 51/0005 |
| | | | 427/8 |
| 2010/0207983 A1 * | 8/2010 | Sasayama | B41J 29/393 |
| | | | 347/14 |
| 2010/0238222 A1 * | 9/2010 | Jogo | B41J 29/38 |
| | | | 347/14 |
| 2016/0167415 A1 * | 6/2016 | Ikeda | B41J 2/2132 |
| | | | 347/14 |
| 2016/0352963 A1 * | 12/2016 | Nagai | H04N 1/3871 |

* cited by examiner

FIG. 3A

| 128 | 128 | 128 | 128 | 128 |
|---|---|---|---|---|
| 128 | 128 | 128 | 128 | 128 |
| 128 | 128 | 95  | 10  | 10  |
| 10  | 10  | 10  | 10  | 10  |
| 10  | 10  | 10  | 10  | 10  |

| -0.02 | -0.04 | -0.05 | -0.04 | -0.02 |
|---|---|---|---|---|
| -0.04 | -0.1  | -0.26 | -0.1  | -0.04 |
| -0.02 | -0.08 | 2.26  | -0.08 | -0.02 |
| -0.04 | -0.1  | -0.26 | -0.1  | -0.04 |
| -0.02 | -0.04 | -0.05 | -0.04 | -0.02 |

| | | | | |
|---|---|---|---|---|
| | | | | |
| | | 102.9 | | |
| | | | | |
| | | | | |

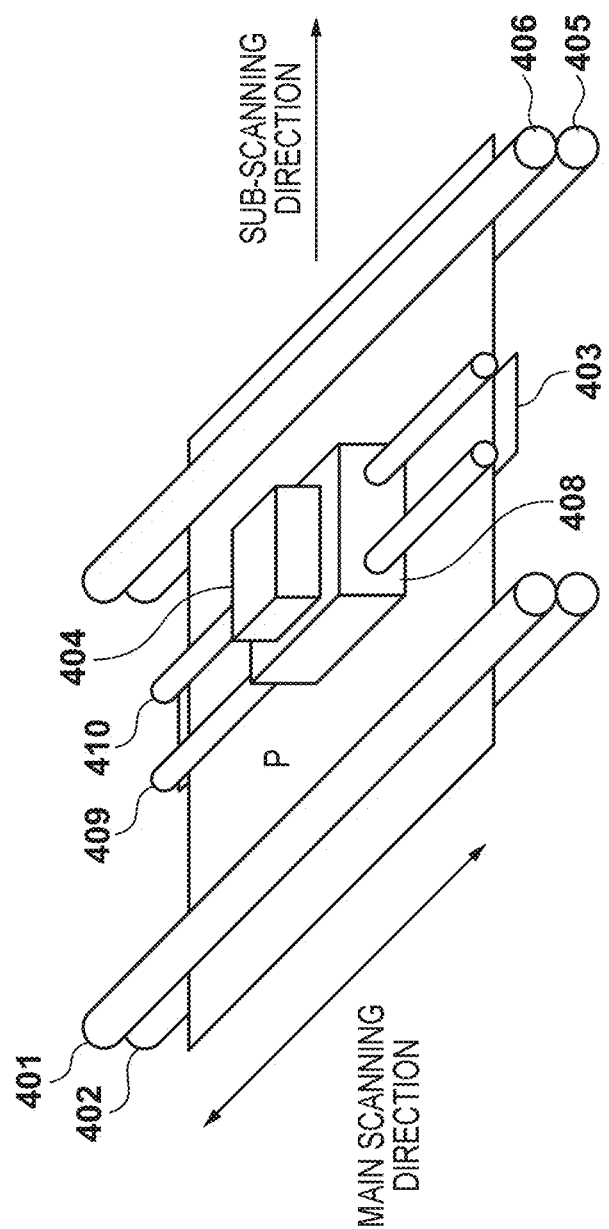

IMAGE PROCESSING APPARATUS, METHOD, AND STORAGE MEDIUM STORING PROGRAM

BACKGROUND OF THE INVENTION

Field of the Invention

The present invention relates to an image processing apparatus for performing printing processing of image data, a method, and a storage medium storing a program.

Description of the Related Art

In an image forming apparatus, the sharpness of an output image is known to be decreased by the displacement of an ink landing position, an ink smear, an optical blur (optical dot gain), or the like. In this case, the frequency characteristic of the decrease in the sharpness of the output image is acquired, and filter processing with a reverse characteristic (sharpness recovery filter) is performed, thereby canceling the decrease in the sharpness of the output image.

The frequency characteristic of the decrease in the sharpness changes depending on the type (an inkjet printing method, an electrophotographic printing method, or the like) or model of the image forming apparatus, the type of a printing medium (paper), output conditions, the light source distribution (angle/direction) upon observation, and the like. For example, in an image forming apparatus of an inkjet printing method, an ink smear by an ink type (dye or pigment) and an optical dot gain at the time of observation change depending on a printing medium.

Japanese Patent Laid-Open No. 2003-153865 describes a technique of performing sharpness recovery processing using a sharpness recovery filter that changes depending on a printing medium, an ink type, an input device, and a portion of an object. As a technique of recovering the sharpness of an image, a PSF (Point Spread Function) is known. A blurred image can be considered as a result of convolution of a PSF in an original sharp image. For this reason, image reconstruction by deconvolution can be performed by grasping the PSF. In "Digital Image Processing Engineering" (written by Keiichi Tezuka, Tadahiro Kitahashi, and Hideo Ogawa, 1st impression of 1st edition, Nikkan Kogyo Shimbun, Jun. 15, 1985, pp. 54-57), a Wiener filter is described as an example of this technique.

An optic transfer function (OTF) that can be obtained by Fourier transformation of a PSF is information in a frequency space. This optic transfer function (OTF) can be represented by a complex number. The absolute value of the OTF, that is, the amplitude component is called an MTF (Modulation Transfer Function), and the phase component is called a PTF (Phase Transfer Function). As a method of correcting a blur of an image, a method of performing correction using the information of the optic transfer function (OTF) of an imaging optical system is known. This method is called image recovery or image reconstruction.

The sharpness degradation characteristic of an image forming apparatus may anisotropically change in accordance with the printing direction. For example, in a serial-type inkjet printing apparatus, the decrease in sharpness becomes larger in the main scanning direction than in the sub-scanning direction due to satellites, time-divisional driving, or the like. For this reason, in a method of performing isotropic sharpness recovery processing independent of the printing direction, an optimum recovery intensity cannot be set, resulting in an image degradation. For example, if sharpness recovery processing is performed at an intensity lower than the optimum intensity, the sharpness cannot sufficiently be recovered, and an image of a blurred impression is formed. If sharpness recovery processing is performed at an intensity higher than the optimum intensity, an outline portion in the image is excessively enhanced, resulting in so-called ringing.

SUMMARY OF THE INVENTION

An aspect of the present invention is to eliminate the above-mentioned problems with the conventional technology. The present invention provides an image processing apparatus that appropriately compensates for a degradation in image quality in accordance with a printing direction, a method, and a storage medium storing a program.

The present invention in one aspect provides an image processing apparatus for processing image data used for printing by a printing unit configured to discharge ink droplets from a printhead, thereby printing an image on a printing medium based on image data in a printing direction that is a scanning direction of the printhead, comprising: an acquisition unit configured to acquire the image data; and a processing unit configured to process the image data acquired by the acquisition unit using a filter configured to compensate for degradation in the image that occurs when the image is printed, wherein a degree of compensation for the degradation in the image by the filter depends on the printing direction, and a degree of compensation for the degradation in the image by the filter in the scanning direction of the printhead is larger than a degree of compensation for the degradation in the image by the filter in a direction crossing the scanning direction.

According to the present invention, it is possible to appropriately compensate for a degradation in image quality in accordance with a printing direction.

Further features of the present invention will become apparent from the following description of exemplary embodiments with reference to the attached drawings.

BRIEF DESCRIPTION OF THE DRAWINGS

FIGS. 3A to 3C are views for explaining a recovery filter;

FIG. 4 is a perspective view showing the arrangement of a printing unit;

DESCRIPTION OF THE EMBODIMENTS

Figure 1:
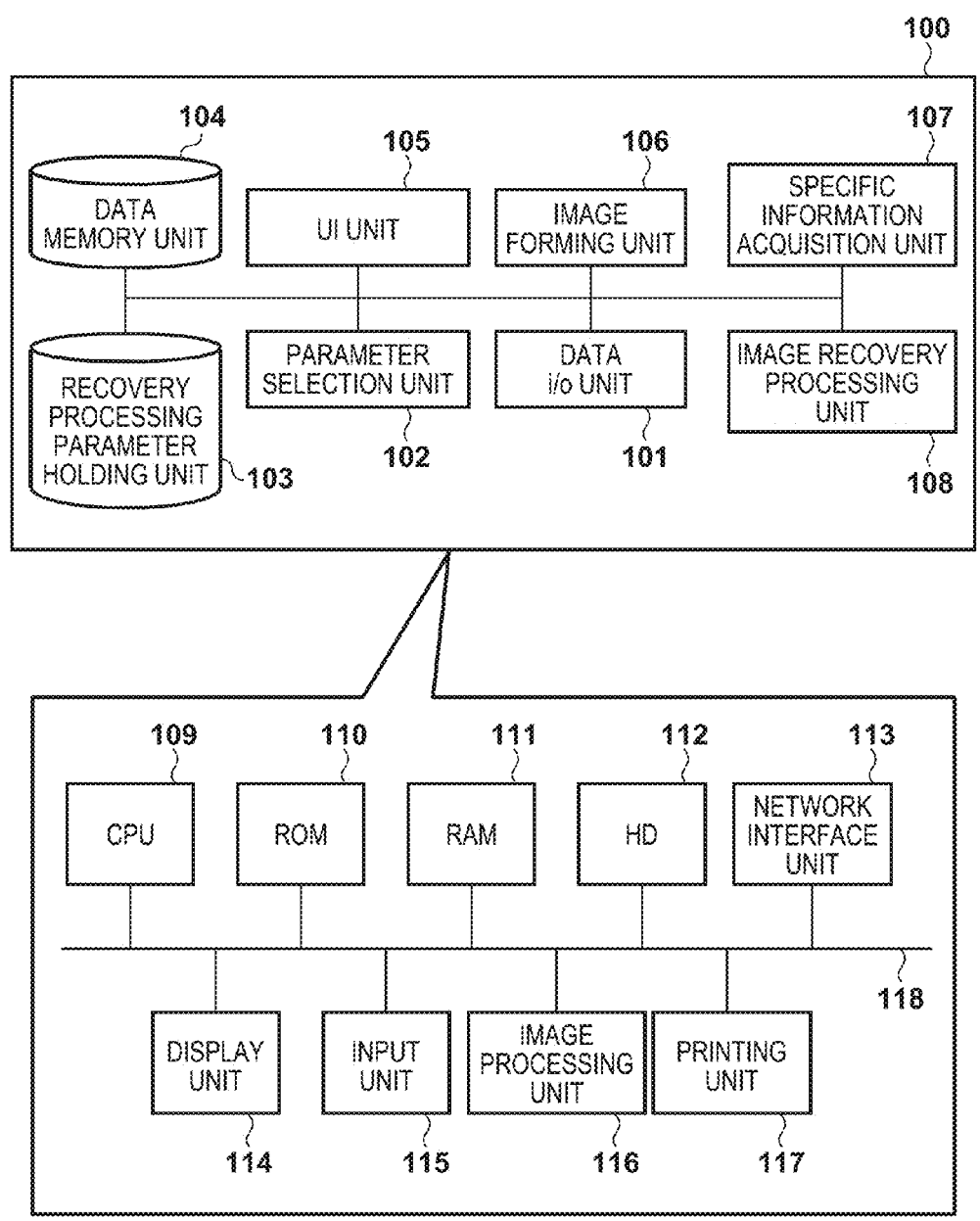
FIG. 1 is a block diagram showing the arrangement of an image forming apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a description thereof will be omitted.

First Embodiment

FIG. 1 is a block diagram showing the arrangement of an image forming apparatus 100. The lower part of FIG. 1 shows the block diagram of the hardware arrangement of the image forming apparatus 100, and the upper part of FIG. 1 shows the block diagram of the software configuration of the image forming apparatus 100. In this embodiment, the image forming apparatus 100 is a printing apparatus that prints an image or the like on a printing medium such as printing paper. However, the image forming apparatus 100 may be a so-called multi-function peripheral that integrates a plurality of functions such as a printing function, a scanning function, and a facsimile function.

As shown in FIG. 1, the image forming apparatus 100 includes a CPU 109, a ROM 110, a RAM 111, a hard disk (HD) 112, and a network interface unit 113. The image forming apparatus 100 also includes a display unit 114, an input unit 115, an image processing unit 116, and a printing unit 117.

The CPU 109 generally controls the image forming apparatus 100 and executes each executable function. The ROM 110 is a general-purpose ROM and stores, for example, control programs, various kinds of data, and the like necessary for the image forming apparatus 100 to operate. The RAM 111 is a general-purpose RAM and operates as, for example, the work memory of the CPU 109. The operation of each embodiment to be described below is implemented when, for example, the CPU 109 loads a program stored in the ROM 110 to the RAM 111 and executes it. The hard disk (HD) 112 is a general-purpose hard disk and stores, for example, data, tables, and the like used to correct image data in accordance with the characteristic of the image forming apparatus 100.

The network interface unit 113 enables communication with an external apparatus via a network such as a LAN. The network may be a wired network or a wireless network. For a wireless network, the network interface unit 113 includes an interface configuration corresponding to each wireless communication distance. For example, the network interface unit 113 may include a configuration corresponding to near field communication of a communication distance of about 5 cm.

The display unit 114 is, for example, a display and displays the device state of the image forming apparatus 100, job progress information, the setting screens of functions executable by the image forming apparatus 100, and the like. The input unit 115 includes, for example, hardware keys, and accepts a user operation. A touch panel displayed on the display unit 114 may accept the user operation.

The image processing unit 116 executes various kinds of image processing for image data of a processing target. For example, the image processing unit 116 converts image data into binary data corresponding to discharge/nondischarge of an ink droplet. In addition to the binarization processing, the image processing unit 116 executes processing such as color space conversion, HV conversion, gamma correction, and image rotation/reduction/enlargement. The image processing unit 116 is formed from, for example, a chip such as an FPGA. The image processing unit 116 may be formed from a plurality of chips corresponding to the processes.

The printing unit 117 includes the mechanism of a so-called printer engine. For example, when the image forming apparatus 100 performs printing using an inkjet printing method, the printing unit 117 includes a printhead, a carriage driving mechanism, a controller that performs ink discharge control, and the like.

The above-described units are connected by a system bus 118 so as to be communicable with each other. If the image forming apparatus 100 is a multi-function peripheral, it may further include blocks corresponding to the functions. For example, a scanner unit including the arrangement of a scanner engine may be connected to the system bus 118.

In the image forming apparatus 100, the CPU 109 implements the functional blocks of a data i/o unit 101, a parameter selection unit 102, and a recovery processing parameter holding unit 103 by, for example, executing a program. The CPU 109 also implements the functional blocks of a data memory unit 104, a user interface (UI) unit 105, an image forming unit 106, a specific information acquisition unit 107, and an image recovery processing unit 108 by, for example, executing a program. The CPU 109 may implement another functional block (not shown in FIG. 1) in accordance with an executable function of the image forming apparatus 100.

The data i/o unit 101 controls data to be transmitted/received to/from an external apparatus via the network interface unit 113. Here, the external apparatus is, for example, a host computer that transmits a job, data, and the like to the image forming apparatus 100. The parameter selection unit 102 acquires a recovery filter held by the recovery processing parameter holding unit 103 implemented on a storage area of the ROM 110, the HD 112, or the like and used to compensate for a decrease in the sharpness of an output image. The recovery processing parameter holding unit 103 is implemented on a storage area of the ROM 110, the HD 112, or the like and holds the recovery filter. The recovery filter will be described later.

The data memory unit 104 is implemented on a storage area of the ROM 110, the HD 112, or the like and stores image data of a processing target of the image forming apparatus 100. The UI unit 105 accepts output conditions necessary for the image forming unit 106 to form an image via a user operation for the input unit 115 corresponding to a setting item on a setting screen displayed on the display unit 114. Here, the output conditions are the printing conditions of the printing unit 117 and include, for example, the number of printing passes, the carriage speed, the printing direction (bidirectional printing or unidirectional printing), a halftone pattern, the distance between the printhead and a printing medium, the presence/absence of use of clear ink, color settings, and the type of a printing medium.

The image forming unit 106 is an image processing block configured to perform image formation by the printing unit 117, and is implemented on, for example, the image processing unit 116 formed from a chip such as an FPGA. The image processing includes, for example, processing of converting image data of a processing target into binary data used to control ink discharge/nondischarge from the printhead of the printing unit 117, as described concerning the image processing unit 116. In addition to the binarization processing, the image forming unit 106 executes processing such as color space conversion, HV conversion, gamma correction, and reduction/enlargement.

The specific information acquisition unit 107 acquires the output conditions of the image forming unit 106 from the UI unit 105. The image recovery processing unit 108 executes filter processing by a recovery filter for image data of a processing target. The parameter selection unit 102, the specific information acquisition unit 107, and the image recovery processing unit 108 shown in FIG. 1 may be implemented on the image processing unit 116, like the image forming unit 106.

FIG. 1 shows an example in which the blocks shown in the upper part and the lower part are constituted in a single apparatus as the image forming apparatus 100. However, they may be implemented as a plurality of apparatuses. For example, blocks other than the image forming unit 106 and the printing unit 117 may be constituted in an image processing apparatus (for example, host computer) that controls the printing operation of the printing unit 117. An arrangement including the image forming unit 106 and the printing unit 117 may be constituted as the image forming apparatus 100, and the embodiments may be implemented by these arrangements.

Figure 2:
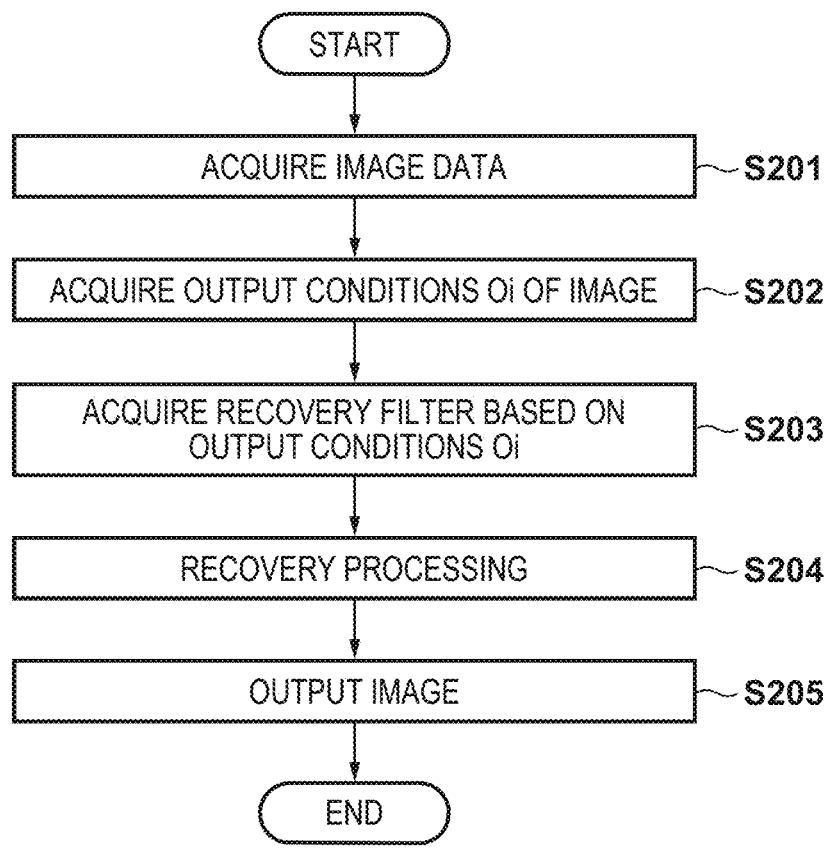
FIG. 2 is a flowchart showing image forming processing.

FIG. 2 is a flowchart showing image forming processing of the image forming apparatus 100. The processing shown in FIG. 2 is implemented when, for example, the CPU 109 loads a program stored in the ROM 110 to the RAM 111 and executes it.

In step S201, the image recovery processing unit 108 acquires image data of a processing target via the data i/o unit 101 or image data created by an application executed on the image forming apparatus 100, and stores it in the data memory unit 104. The image data of the processing target will be referred to as input image data i hereinafter.

In step S202, the input unit 115 accepts a user operation via a print setting screen. The specific information acquisition unit 107 acquires output conditions Oi of the image forming unit 106 via the UI unit 105 as specific information. Here, the output conditions Oi include, for example, the number of printing passes, the carriage speed, the printing direction (bidirectional printing or unidirectional printing), a halftone (HT) pattern, the distance between the printhead and a printing medium, the presence/absence of use of clear ink, color settings, and the type of a printing medium, as described above. The output conditions Oi also include a condition that directly reflects a setting by the user and a condition newly set based on a setting by the user.

In step S203, the parameter selection unit 102 accesses the recovery processing parameter holding unit 103 and acquires a recovery filter Ri corresponding to the output conditions Oi acquired in step S202.

In step S204, the image recovery processing unit 108 executes filter processing by the recovery filter Ri for the input image data i. The image recovery processing unit 108 generates image data i' after recovery processing. The image recovery processing unit 108 stores the generated image data i' after recovery processing in the data memory unit 104.

Figure 5:
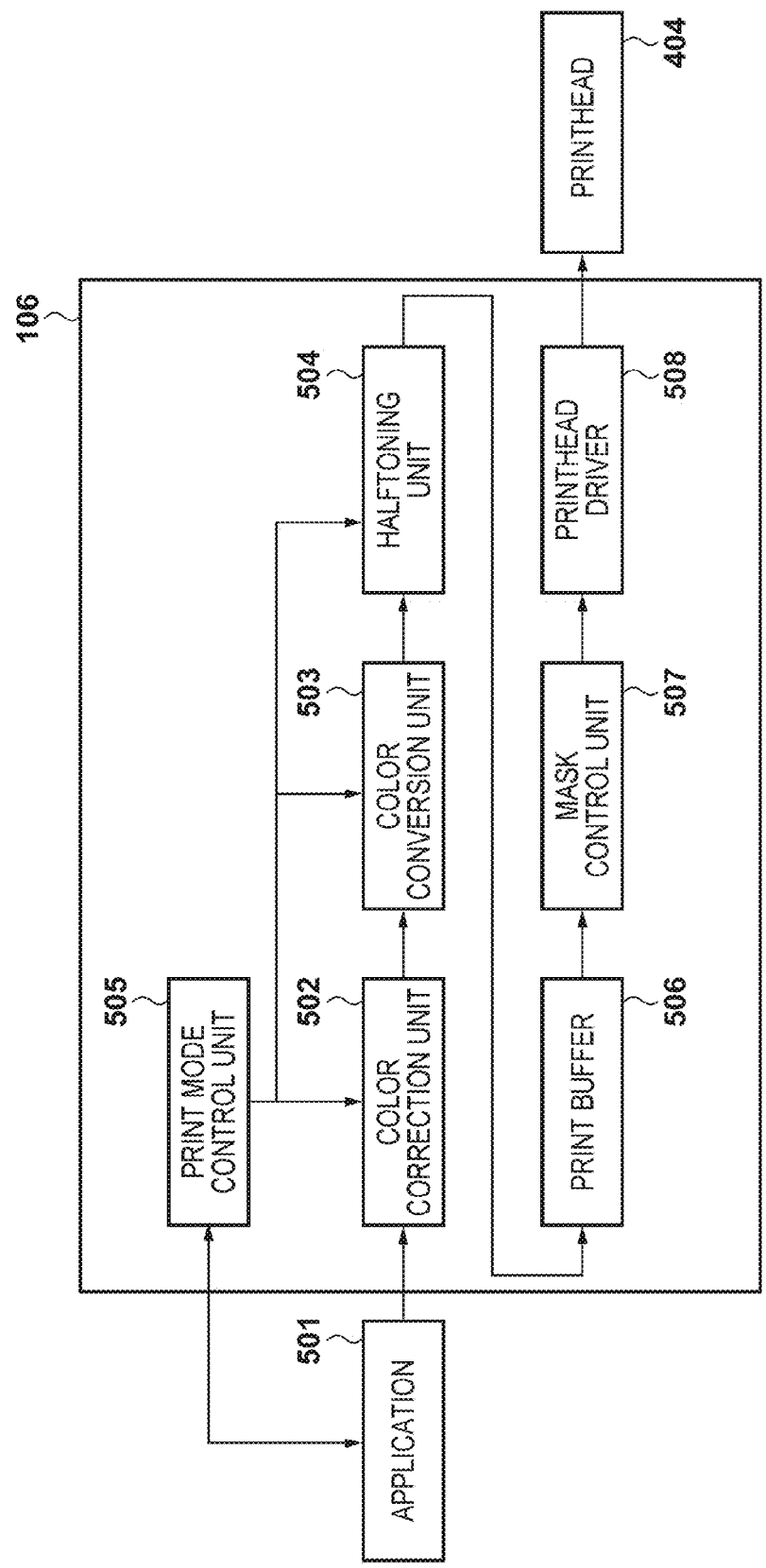
FIG. 5 is a block diagram for explaining a printing system in an image forming unit.

In step S205, based on the output conditions Oi, the image forming unit 106 reads out the image data i' after recovery processing from the data memory unit 104 and causes a color correction unit 502 shown in FIG. 5 to perform color correction. After that, the processes of blocks to be described later with reference to FIG. 5 are performed, and an image is formed on a printing medium based on the image data i' after recovery processing. After the process of step S205, the processing shown in FIG. 2 ends.

The filter processing of step S204 is executed for the luminance value or brightness (lightness) of the image, and as a result, a change in the tint of the output image based on the original image data is suppressed. However, the filter processing of step S204 may be executed for other parameters, for example, RGB or CMYK.

FIGS. 3A to 3C are views for explaining a recovery filter. FIG. 3A shows pixel values in a predetermined region (for example, a region of 5×5 pixels) of the input image data i. FIG. 3B shows the recovery filter Ri. FIG. 3C shows a result (pixel value) obtained by executing the recovery processing of step S204 for the pixel value at the center shown in FIG. 3A.

The outline of recovery processing will be described here.

Let $g(x,y)$ be a degraded image, $f(x,y)$ be an original image, and $h(x,y)$ be the point spread function (PSF) of an imaging system used to acquire $g(x,y)$. At this time, $$g(x,y)=h(x,y)*f(x,y) \quad (1)$$

holds, where * represents convolution (convolution integral or product sum), and $(x,y)$ are the coordinates of the image in a real space.

When equation (1) is Fourier-transformed into a display form in a frequency space, we obtain $$G(u,v)=H(u,v) \cdot F(u,v) \quad (2)$$

where $H(u,v)$ is an optic transfer function (OTF) obtained by Fourier-transforming the point spread function (PSF) $h(x,y)$. $G(u,v)$ and $F(u,v)$ are obtained by Fourier-transforming $g(x,y)$ and $f(x,y)$, respectively. $(u,v)$ represent a frequency (coordinates) in a two-dimensional frequency space.

To obtain the original image from the degraded image, both sides of equation (2) are divided by $H(u,v)$.

$$G(u,v)/H(u,v)=F(u,v) \quad (3)$$

$F(u,v)$, that is, $G(u,v)/H(u,v)$ is returned to the real space by inverse Fourier transformation, thereby obtaining the original image $f(x,y)$ as a recovered image.

When both sides of equation (3) are inversely Fourier-transformed, equation (3) is represented by $$g(x,y)*R(x,y)=f(x,y) \quad (4)$$

where $R(x,y)$ is a result obtained by inversely Fourier-transforming $1/H(u,v)$. $R(x,y)$ is a recovery filter. Since this image recovery filter is based on the optic transfer function (OTF), a degradation in the amplitude component and phase component can be corrected.

Generally, the data amount of a recovery filter or OTF is enormous. For example, information of 300 pixels or more is necessary for one pixel. According to a simple calculation, a data amount several hundred times larger than the number of pixels of the image is needed. To decrease the data amount, the OTF may be replaced with coefficient data obtained by converting the OTF into a discrete OTF or further approximating the discrete OTF by a specific approximate expression. When the coefficient data is statically held, the data can be decreased as compared to a case in which the OTF or recovery filter is directly held.

The recovery filter is a filter to be applied to a target pixel and pixels around it, like general filter processing such as a conventional sharpness filter or median filter. For this reason, processing can be performed like normal filter application processing.

The recovery filter Ri according to this embodiment also has anisotropy in the vertical and horizontal directions of an image, as in FIG. 3B.

The recovery filter is obtained using equation (1) described above. However, the recovery filter may be obtained using equation (2) in the frequency space. In this case, the calculation time can further be shortened. In FIG. 3B, the recovery filter Ri is represented by a square filter having a size of 5×5 pixels, and the vertical (corresponding to a sub-scanning direction to be described later) size of the image of the corresponding region equals the horizontal (corresponding to a main scanning direction to be described later) size.

FIG. 4 is a perspective view showing the arrangement of the printing unit 117. A printing medium P is fed by an automatic feeder (not shown) using a feed motor as a driving source to a nip portion constructed by a conveyance roller 401 arranged on the conveyance path and a pinch roller 402 driven by the conveyance roller 401. After that, the printing medium P is intermittently conveyed in the sub-scanning direction (conveyance direction) crossing the main scanning direction shown in FIG. 4 by the pair of the conveyance roller 401 and the pinch roller 402 and the pair of a discharge roller 405 and a pinch roller 406. A platen 403 is provided along the conveyance path facing the ink droplet discharge surface of a printhead 404. The printing medium P printed by the printing unit on the platen 403 is conveyed in the sub-scanning direction by the pair of the discharge roller 405 and the pinch roller 406 and discharged to a discharge tray (not shown).

The printhead 404 is detachably mounted on a carriage 408. The carriage 408 can be moved reciprocally in the main scanning direction along two guide rails 409 and 410 by the driving force of a carriage motor. In the process of movement, the printhead 404 discharges ink droplets onto the printing medium based on print data, thereby performing printing. Print scanning by the printhead 404 and the printing medium conveyance operation are alternately repeated, and an image is formed stepwise on the printing medium P.

Although not illustrated in FIG. 4, an optical sensor that reads the image printed on the printing medium P is constituted on the bottom surface of the carriage 408. The optical sensor includes, for example, an LED light source and a photodiode that detects reflected light from the printing medium. After the image is printed on the printing medium P by the above-described operation, the CPU 109 rotates the conveyance roller 401 and the discharge roller 405 in reverse directions, thereby returning the printing medium P to the platen 403 in a direction reverse to that in printing. The CPU 109 then moves the carriage 408 in the main scanning direction, thereby causing the optical sensor to acquire brightness (luminance) on the printing medium P.

FIG. 5 is a block diagram for explaining a printing system in the image forming unit 106. Here, an external host computer includes an application 501.

In the image forming unit 106, the color correction unit 502 performs, for image data input from the application 501, color correction according to an image characteristic to be output. A color conversion unit 503 converts the RGB signals of the image data that has undergone the color correction to signals (print data) corresponding to ink colors to be used by the image forming unit 106. In this embodiment, the image data is converted into signals corresponding to, for example, a total of eight ink colors, that is, cyan (C), magenta (M), yellow (Y), black (Bk), light cyan (LC), light magenta (LM), gray (Gy), and light gray (LGy). A halftoning unit 504 performs pseudo halftoning processing such as error diffusion for the input multilevel signal of each ink color, thereby converting the multilevel signal into a signal of tones necessary for the image forming unit 106 to implement a printing operation, that is, a binary signal per bit.

A print mode control unit 505 sets parameters to be used by the color correction unit 502, the color conversion unit 503, and the halftoning unit 504 in accordance with the designation contents of the printing medium and printing quality accepted via the user interface screen of the application 501. The print mode control unit 505 also transfers print mode information to the color correction unit 502, the color conversion unit 503, and the halftoning unit 504 as a control command. The print mode information is, for example, information about the number of printing passes or a mask pattern corresponding to the number of printing passes.

A print buffer 506 receives the print mode information and the binary print data that has undergone the halftoning processing, and transfers them to a mask control unit 507 such that print data of one scanning corresponds to each printing element of the printhead 404.

Based on the print mode information transferred from the application 501 via the print buffer 506 the mask control unit 507 selects an appropriate mask pattern from a plurality of patterns of masks (gradation masks) prepared for multipass printing. The mask control unit 507 then performs mask processing for the input binary print data using the selected mask pattern. The binary print data thinned by the mask processing is transferred to a printhead driver 508 and converted into an electric signal to drive an energy generation element for ink discharge such as a heater included in each printing element (nozzle) of the printhead 404.

The electric signal generated by the printhead driver 508 is transferred to each printing element of the printhead 404 at a predetermined timing. Each printing element thus discharges an ink droplet in accordance with the electric signal. In this embodiment, in a multipass printing method of scanning a unit printing region on the printing medium a plurality of times, the printhead 404 discharges ink droplets based on the print data thinned by the mask processing in each scanning.

Figure 6:
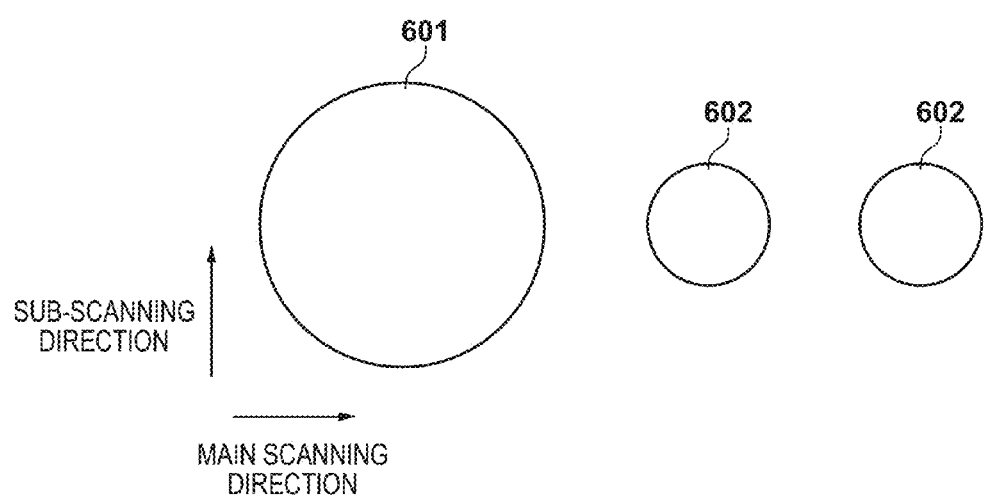
FIG. 6 is a view for explaining a decrease in sharpness caused by satellites.

FIG. 6 is a view for explaining a decrease in sharpness caused by satellites discharged from a nozzle. When one droplet (ink droplet) is discharged from the printhead 404, sub-droplets in small amounts may be discharged following a main droplet 601. In general, such sub-droplets reach the printing medium surface after the main droplet because their speed of discharge to the printing medium is lower than that of the main droplet. Hence, each sub-droplet lands at a position displaced from the main droplet in the main scanning direction by an amount corresponding to the scanning speed of the carriage 408 and forms a small-diameter print dot 602 called a satellite. The landing positions in the main scanning direction are misaligned by such satellites, and a decrease in sharpness occurs depending on the main scanning direction.

Figure 7:
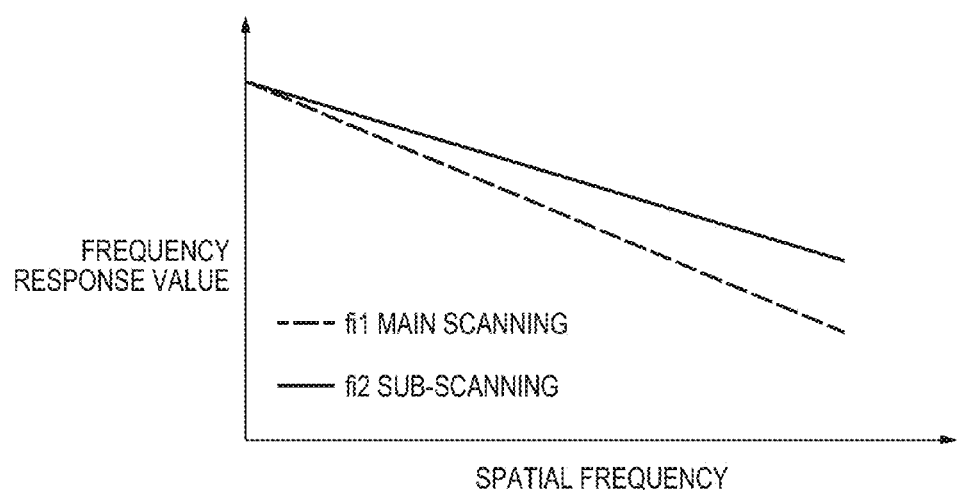
FIG. 7 is a graph showing frequency characteristics in the main scanning direction and the sub-scanning direction of an output image.

FIG. 7 is a graph showing an example of frequency response values fi1 and fi2 in the main scanning direction and the sub-scanning direction of an output image. As shown in FIG. 7, the decrease ratio of the high-frequency component in the main scanning direction is larger than the decrease ratio of the high-frequency component in the sub-scanning direction, and the degree of the decrease in the sharpness is large in the main scanning direction. In this embodiment, recovery filters corresponding to the frequency response values fi1 and fi2 that are different depending on the direction are used, thereby changing the recovery amount. That is, recovery processing can appropriately be performed using a recovery filter that makes the recovery amount larger in the main scanning direction in which the decrease in sharpness caused by satellites is large than in the sub-scanning direction. Note that a method of acquiring a frequency response value fi corresponding to the output conditions Oi will be described later.

A decrease in sharpness caused by time-divisional driving of printing elements will be described next.

Figure 8:
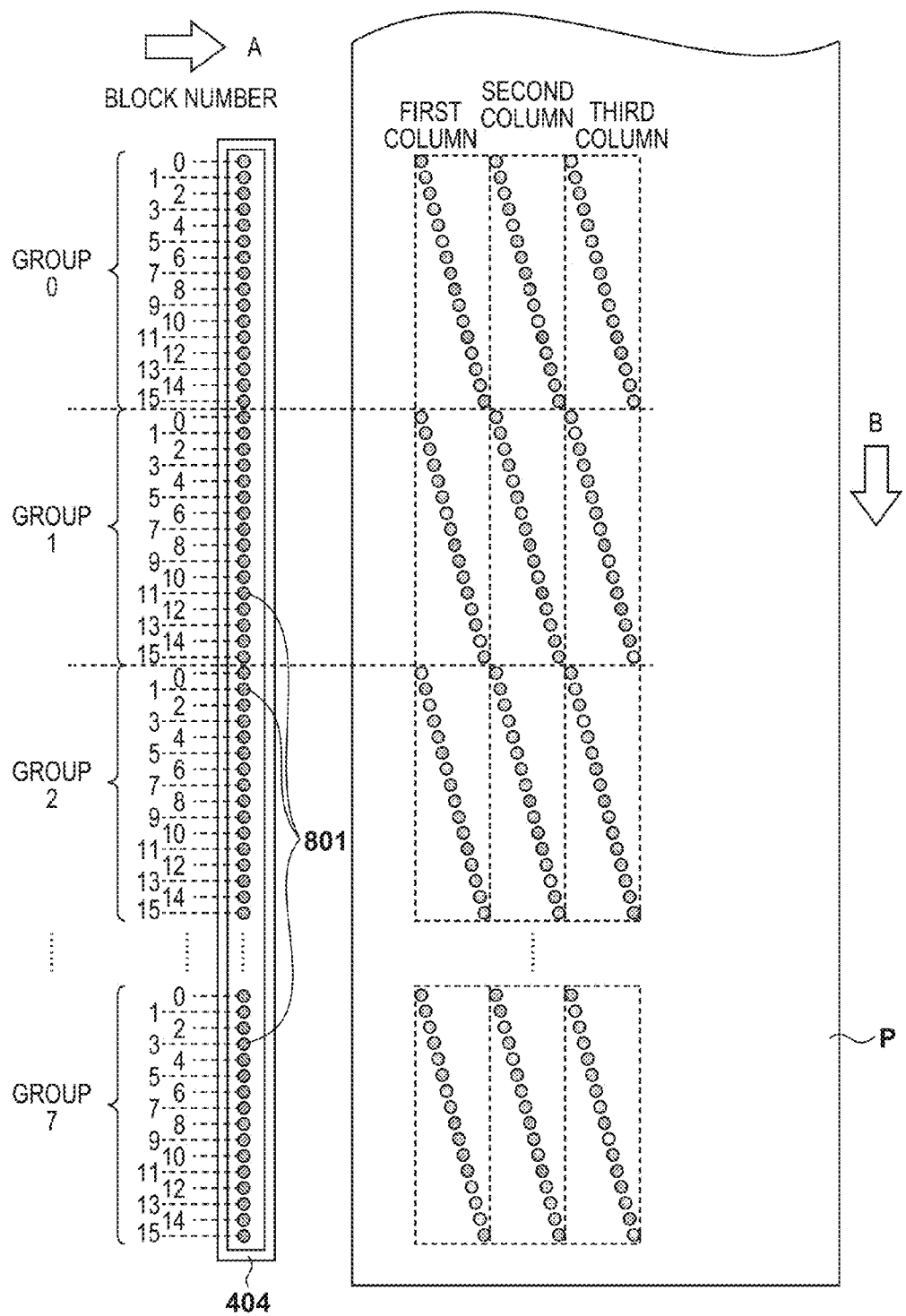
FIG. 8 is a view showing the arrangement of print dots formed by a serial-type printhead.

FIG. 8 is a view showing the arrangement of print dots formed on the printing medium P by a serial-type printhead. In FIG. 8, the orifice array of the printhead 404 is arranged in parallel to the sub-scanning direction indicated by an arrow B. The printhead 404 moves on the printing medium P from left to right in the main scanning direction indicated by an arrow A, thereby performing printing. The printing medium P is conveyed in the direction of the arrow B. The upper side in FIG. 8 is the upstream side in the sub-scanning direction, and the lower side is the downstream side in the sub-scanning direction.

In FIG. 8, printing elements corresponding to 128 orifices 801 of the printhead 404 are divided into eight groups from group 0 to group 7 each including 16 printing elements. Different blocks are assigned to the printing elements in each group, and the printing elements are sequentially driven on a block basis. Here, the printing elements are divided into groups 0 to 7 each including 16 printing elements sequentially from the printing elements on the upstream side in the sub-scanning direction. In each group, blocks 0 to 15 are assigned sequentially from the printing elements on the upstream side in the sub-scanning direction. The printing elements are driven in a driving order of block 0→1→2→3→4→5→6→7→ 8→ 9→ 10→11→ 12→13→ 14→15, and driving of one cycle (one column) is thus performed.

Print dots formed by one-cycle driving of the printing elements of blocks 0 to 15 are formed in the region of the same column (the width of one pixel). FIG. 8 shows the arrangement of print dots formed on the printing medium when the printing elements are driven in the order of blocks 0 to 15 and the image data of three, first to third columns are assigned to the printing elements. The print dots formed by one-cycle driving of the printing elements of each group are arranged in a predetermined region (same column).

As shown in FIG. 8, when the printing elements are time-divisionally driven, the landing positions in the main scanning direction are displaced, causing a decrease in sharpness depending on the main scanning direction. In this case, the output frequency response values fi1 and fi2 in the main scanning direction and the sub-scanning direction have characteristic features as shown in FIG. 7, as in the case of the satellites shown in FIG. 6.

[Acquisition of Frequency Characteristic of Output Image]

Acquisition of the frequency characteristic of an output image according to this embodiment will be described next. Note that a recovery filter generation method will be described later.

Figure 9:
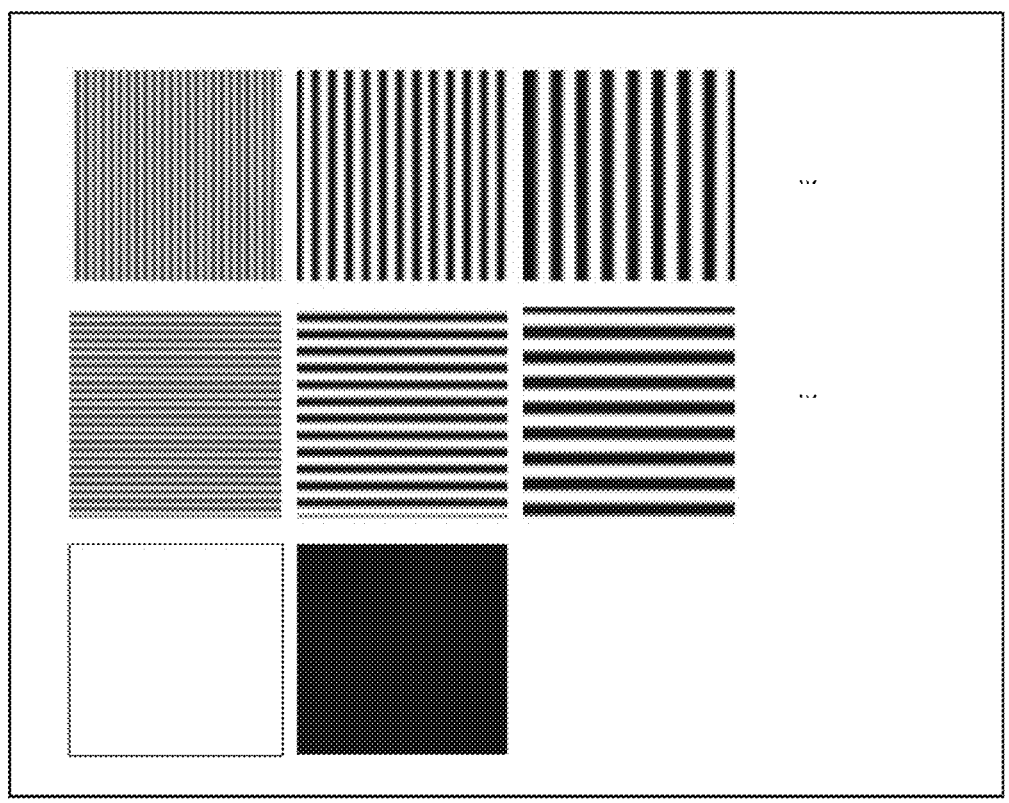
FIG. 9 is a view showing a sharpness measurement chart.

First, the image forming unit 106 outputs a sharpness measurement chart (test image) according to the output conditions Oi (test printing). FIG. 9 is a view showing an example of the sharpness measurement chart. As shown in FIG. 9, the sharpness measurement chart includes an image chart including a plurality of sine wave patterns and even patterns of different frequencies.

The upper part of FIG. 9 shows measurement images that change the brightness in the main scanning direction. The middle part of FIG. 9 shows measurement images that change the brightness in the sub-scanning direction. The lower part of FIG. 9 shows measurement images of even white and black. The sharpness measurement chart shown in FIG. 9 is stored in, for example, the data memory unit 104 on the hard disk 112 or the like.

Next, the image forming unit 106 acquires a frequency response value fi(u) corresponding to the output conditions Oi based on the output sharpness measurement chart, where u is the frequency of a sine wave. As described with reference to FIG. 4, the frequency response value fi(u) is acquired based on, for example, a reading result obtained by the optical sensor formed on the carriage 408. Alternatively, the frequency response value fi(u) may be acquired by a reading unit (scanner) that is not illustrated in FIG. 1. The frequency response value fi(u) may be acquired using another device such as a camera, a microscope, or a microdensitometer.

As the frequency response value fi, for example, MTF(u) obtained by $$fi(u)=MTF(u)=C(u)/C'$$

where $C(u)=(\text{Max}(u)-\text{Min}(u))/(\text{Max}(u)+\text{Min}(u))$, and $$C'=(\text{White}-\text{Black})/(\text{White}+\text{Black}) \quad (5)$$

is used. In equation (5), Max(u) and Min(u) are the maximum reflectance and the minimum reflectance of the sine wave charts, which change depending on a frequency u. Additionally, in equation (5), White and Black are the reflectances of the even patterns, respectively, in the lower part of FIG. 9.

MTF(u) may be obtained using another equation in place of equation (5). For example, MTF(u) may be obtained by $$fi(u)=MTF(u)=(\text{Max}(u)-\text{Min}(u))/(\text{White}-\text{Black}) \quad (6)$$

According to equation (5), in a case in which the average brightness of the output image changes in accordance with the frequency u of the sine wave, the response value is excessively large in a dark portion as compared to a bright portion. Hence, in the case in which the average brightness of the output image changes, equation (6) may be used in place of equation (5). Note that in equations (5) and (6), Max(u) and Min(u), and White and Black are described as reflectances. However, for example, luminance or density, or the RGB values of the device may be used.

The frequency response value fi(u) may be acquired using rectangular wave patterns as the sharpness measurement chart in place of the sine wave patterns. In this case, a CTF value calculated by applying equation (5) to the rectangular wave patterns may be used as the frequency response value fi(u). Alternatively, the CTF value may be converted into an MTF value using the known Coltman's formula and used as the frequency response value fi(u). As the frequency response value fi(u), a subjective evaluation value of sharpness for a frequency pattern may be used.

[Recovery Filter Generation]

In this embodiment, an anisotropic recovery filter is generated, and the recovery amount is changed in accordance with the direction.

Figure 10:
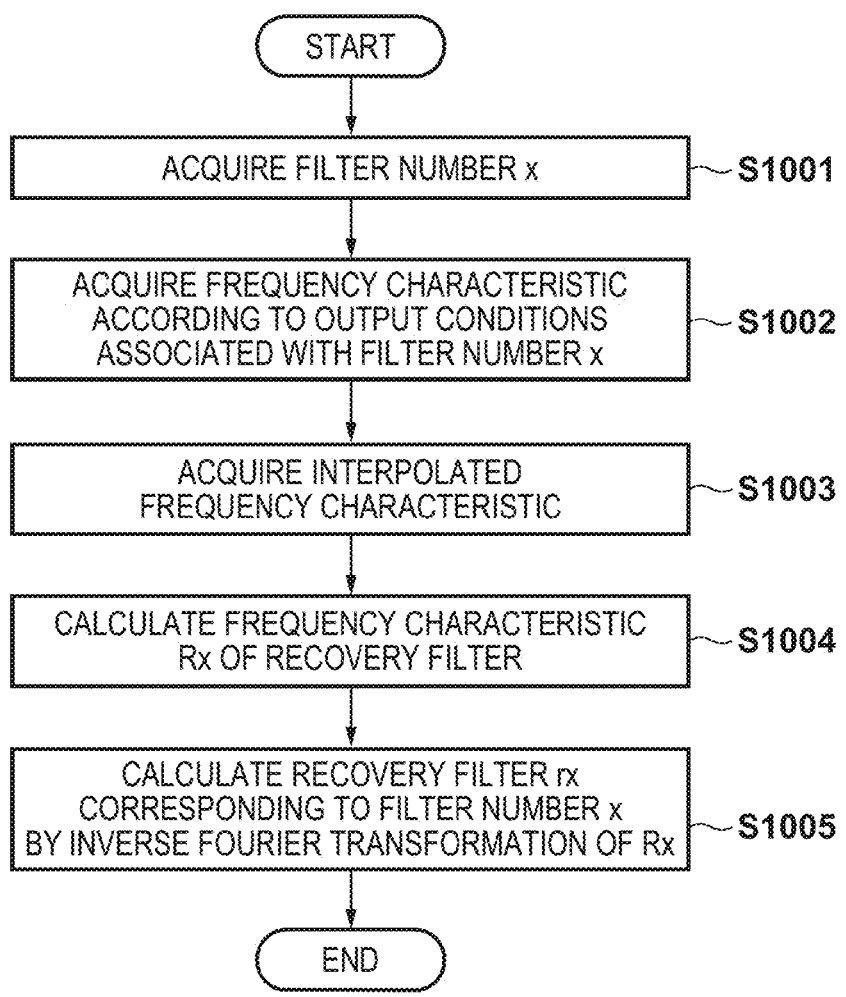
FIG. 10 is a flowchart showing recovery filter creation processing.

FIG. 10 is a flowchart showing recovery filter creation processing. The processing shown in FIG. 10 is implemented when, for example, the CPU 109 loads a program stored in the ROM 110 to the RAM 111 and executes it. The processing shown in FIG. 10 is executed by, for example, the parameter selection unit 102 after acquisition of the frequency response value fi(u) of the sharpness measurement chart shown in FIG. 9.

In step S1001, the parameter selection unit 102 acquires a filter number x to identify a created recovery filter. For example, when the sharpness measurement chart shown in FIG. 9 is output according to the output conditions Oi, the filter number x is associated with the sharpness measurement chart output according to the output conditions Oi.

In step S1002, the parameter selection unit 102 acquires frequency response values fx(u,0) and fx(u,π/2) for the output conditions Oi associated with the filter number x, where u is the spatial frequency. In addition, fx(u,0) represents the frequency response value in the main scanning direction, and fx(u,π/2) represents the frequency response value in the sub-scanning direction.

In step S1003, based on the frequency response values fx(u,0) and fx(u,π/2) in the two different directions, the parameter selection unit 102 obtains a frequency response value fi(u,θ) (θ: angle) of an angle between them by linear interpolation. Another interpolation method may be used here. The frequency response value may be obtained from frequency response values in three or more directions.

In step S1004, the parameter selection unit 102 acquires a frequency response value Rx of a recovery filter by $$Rx(u,\theta)=1/fx(u,\theta) \quad (7)$$

In step S1005, the parameter selection unit 102 performs inverse Fourier transformation for the frequency response value Rx of the recovery filter to obtain a recovery filter Rx. The parameter selection unit 102 stores the acquired recovery filter rx in the recovery processing parameter holding unit 103.

In this embodiment, the recovery processing of step S204 shown in FIG. 2 may be done on the frequency space. In this case, the frequency response value Rx of the recovery filter acquired in step S1004 is held as the recovery filter rx. Note that when performing the recovery processing of step S204, the direction of the image corresponding to the main scanning direction at the time of output is made to match the direction of the filter (θ=0 direction).

As described above, the recovery filter rx acquired in step S1005, the filter number x, and the output conditions Oi are stored in a storage area of the ROM 110 or the like in association with each other. As a result, when performing printing using the same output conditions, the above-described test printing process can be omitted.

Figure 11:
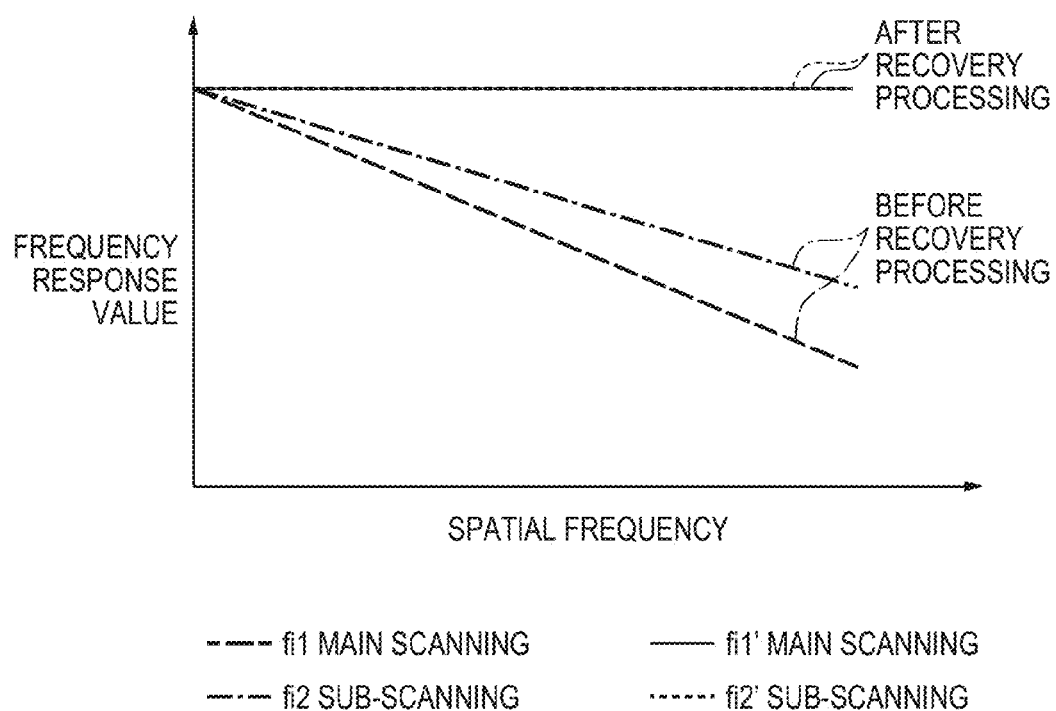
FIG. 11 is a graph showing the comparison between the frequency characteristics of output image data before and after recovery processing.

FIG. 11 is a graph showing an example of the frequency response values fi1 and fi2 in the main scanning direction and the sub-scanning direction of output image data before recovery processing by a recovery filter according to this embodiment and frequency response values fi1' and fi2' in the main scanning direction and the sub-scanning direction of the output image data after the recovery processing.

As shown in FIG. 11, before recovery processing, a decrease in sharpness is observed in a high-frequency region in each of the main scanning direction and the sub-scanning direction. This tendency is the same as in FIG. 7. The degree of the decrease in the sharpness is larger in the main scanning direction because of the above-described satellites of ink droplets and time-divisional driving of the nozzles. As shown in FIG. 11, after the recovery processing, a predetermined frequency response value can be obtained over all frequency regions in both the main scanning direction and the sub-scanning direction. In this embodiment, the sharpness can be recovered by the recovery filter rx in both the main scanning direction and the sub-scanning direction.

In this embodiment, an inkjet printing apparatus having a serial-type printhead has been described. However, an inkjet printing apparatus having a so-called line-type printhead in which the nozzles are arranged in the print width direction of the printing medium P may be used. In this case, printing is performed by a fixed line-type printhead for the printing medium P conveyed in a direction crossing the print width direction. In this form as well, image recovery processing can appropriately be performed using a recovery filter that makes the recovery amount larger in the direction in which the decrease in sharpness is large than in the direction crossing that direction.

Figure 12:
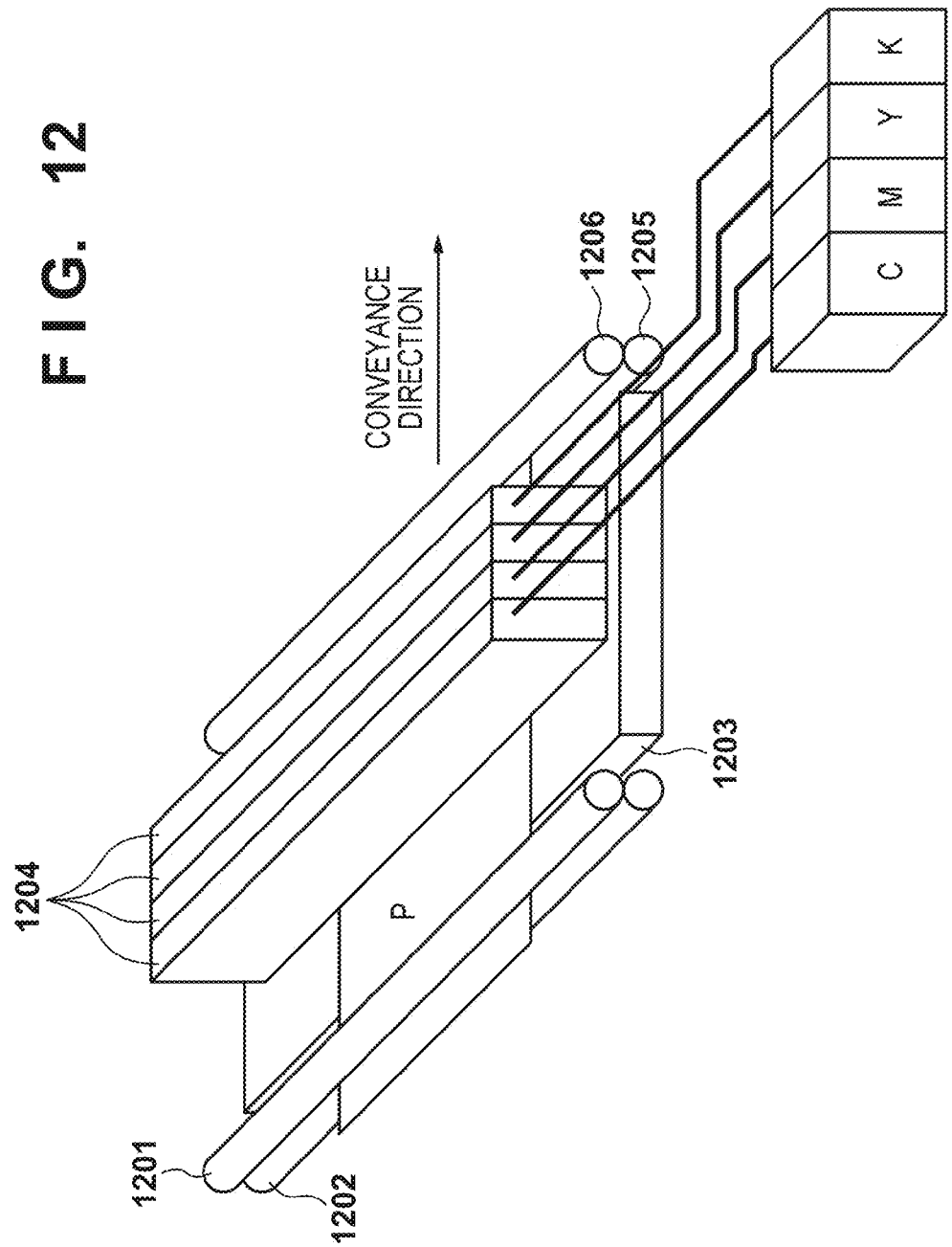
FIG. 12 is a perspective view showing the arrangement of a line-type printhead.

FIG. 12 is a perspective view showing the arrangement of the line-type printhead. The printing medium P is fed onto the conveyance path by a feeder (not shown) using a feed motor as a driving source. Along the conveyance path, a conveyance roller 1201 and a pinch roller 1202 driven by the conveyance roller 1201 are provided. In addition, a discharge roller 1205 and a spur 1206 driven by the discharge roller 1205 are provided on the downstream side of the conveyance path. The fed printing medium P is conveyed in the conveyance direction in FIG. 12 by the pair of conveyance rollers and the pair of discharge rollers. The printhead and the printing medium are thus moved relative to each other. A platen 1203 is provided at a printing position facing a surface (discharge surface) of a printhead 1204 with orifices between the two roller pairs. The printing medium P printed by ink discharge from the printhead of the printing unit on the platen 1203 is conveyed in the conveyance direction by the pair of the discharge roller 1205 and the spur 1206 and discharged to a discharge tray (not shown). The conveyance direction of the printing medium P in FIG. 12 corresponds to the main scanning direction in FIG. 4. Although not illustrated, an optical sensor is provided on the printhead 1204 throughout the print width in the conveyance direction. The CPU 109 can acquire the brightness (luminance) on the printing medium P.

In this embodiment, recovery processing of sharpness in the high-frequency region is performed in the main scanning direction and the sub-scanning direction, as shown in FIG. 11. However, recovery processing performed in the high-frequency region is known to generate noise or decrease brightness. To prevent this, for example, in the region of a spatial frequency corresponding to 4 cycles/mm or more where the sensitivity is low in terms of visual characteristic, the recovery amount may be made small, or recovery may be prohibited.

Figure 13:
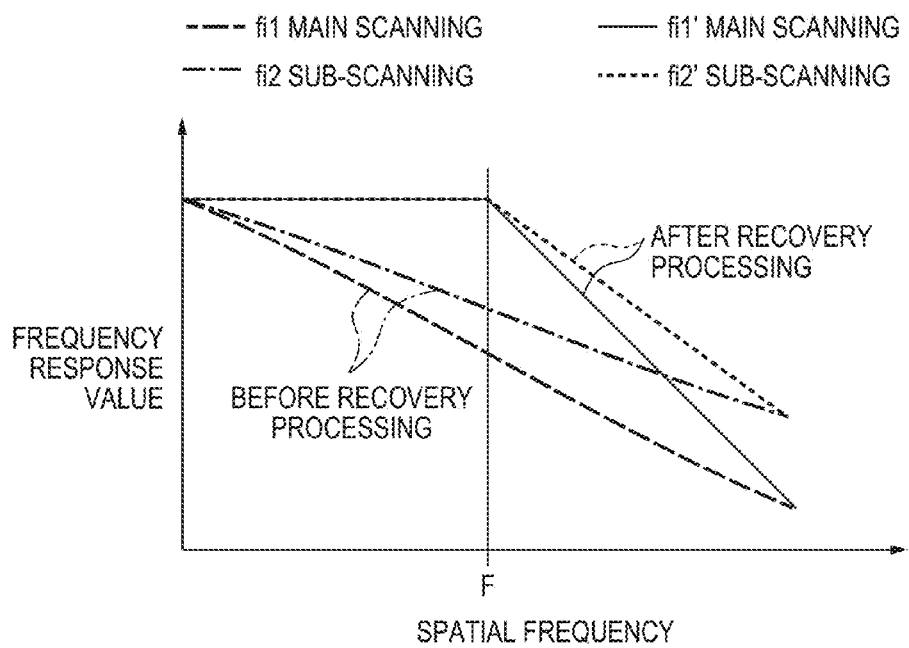
FIG. 13 is a graph showing a case in which the recovery amount in a region of a spatial frequency F or more is made small.

FIG. 13 is a graph showing a case in which the recovery amount in the region of a spatial frequency F corresponding to 4 cycles/mm or more is made smaller than in FIG. 11. As shown in FIG. 13, in the region of the spatial frequency F or more, a decrease in sharpness is observed in the main scanning direction and the sub-scanning direction. However, its influence on the visual characteristic is small. Hence, in the case of FIG. 13, the recovery accuracy need not be strict in the region of the spatial frequency F or more, and the processing load can be reduced.

Figure 14:
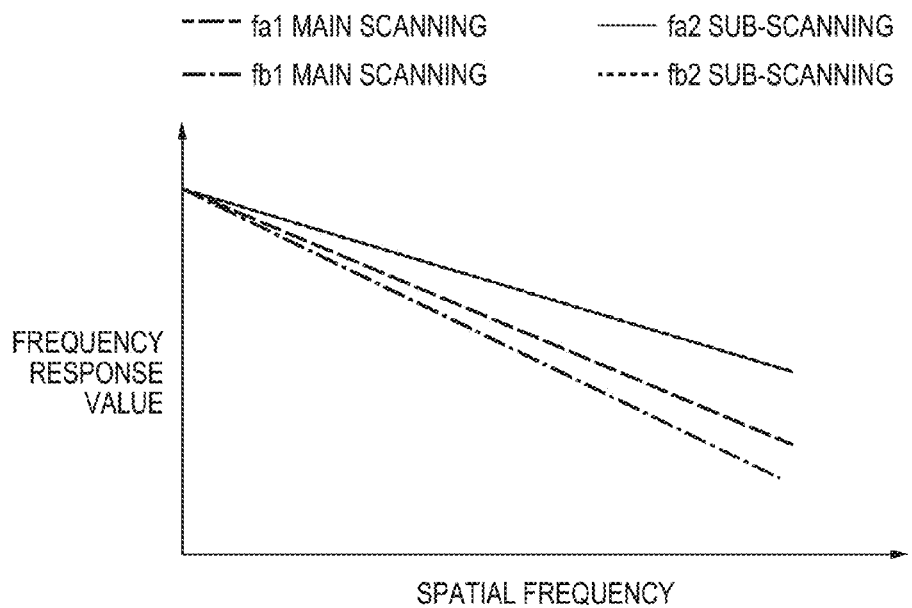
FIG. 14 is a view for explaining a change in the frequency characteristic when an output condition has changed.

As described above, in the output image of the inkjet printing apparatus, the sharpness changes depending on the direction due to the influence of satellites. Hence, when the carriage speed in the arrangement shown in FIG. 4 or the conveyance speed of the printing medium P in the arrangement shown in FIG. 12 changes, the relative positions of main droplets (droplets that form the density) and satellites (droplets other than the main droplets) are displaced. This is because the discharge speed of the main droplets is different from that of the satellites. The higher the speed is, the larger the displacement amount is. That is, the degree of the decrease in sharpness in the high-frequency region becomes large. As a result, the frequency characteristic in the main scanning direction of the output image data changes, for example, from fa1 to fb1 in FIG. 14. Note that in FIG. 14, the frequency characteristics in the sub-scanning direction are represented by fa2 and fb2.

In addition, the sharpness also changes depending on the thickness of the printing medium or the height of the printhead, that is, the distance between the printhead and the surface of the printing medium. The longer the distance between the printhead and the surface of the printing medium is, the larger the landing position displacement is. That is, the degree of the decrease in sharpness in the high-frequency region becomes large. As a result, the frequency characteristic in the main scanning direction of the output image data changes, for example, from fa1 to fb1 in FIG. 14, as in the case of satellites.

As described above, the frequency characteristic of output image data changes depending on the output conditions Oi of the image forming apparatus 100. Even in this case, in this embodiment, a recovery filter corresponding to the carriage speed as the output condition Oi or the distance between the printhead and the surface of the printing medium can be prepared. It is consequently possible to perform sharpness recovery processing appropriate for the output conditions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110799, filed May 29, 2015, which is hereby incorporated by reference herein in its entirety.

What is claimed is:

1. An image processing apparatus for processing image data used for printing by a printing unit configured to discharge ink droplets from a plurality of nozzles that are arranged in a predetermined direction of a printhead, thereby printing an image on a printing medium based on image data in a printing direction, intersecting with the predetermined direction, that is a scanning direction of the printhead, comprising:
   an acquisition unit configured to acquire the image data;
   a processing unit configured to perform processing to change, by filter processing, a pixel value of the image data acquired by the acquisition unit, using a filter configured to enhance sharpness of the image; and
   an output unit configured to output the processed image data as data used for printing by the printhead,
   wherein a degree of enhancing the sharpness of the image, by the filter processing so as to change frequency characteristics, is greater in the scanning direction than in the predetermined direction, and
   wherein the acquisition unit, the processing unit, and the output unit are implemented by at least one processor and at least one memory.

2. The apparatus according to claim 1, further comprising:
   a test printing unit configured to control the printing unit so as to print a plurality of test images of different spatial frequencies for each of a plurality of directions, including the printing direction, on the printing medium; and
   a second acquisition unit configured to acquire the filter based on the test images printed by the test printing unit,
   wherein the processing unit processes the image data using the filter acquired by the second acquisition unit, and
   wherein the test printing unit and the second acquisition unit are implemented by at least one processor and at least one memory.

3. The apparatus according to claim 2, further comprising a control unit configured to control a reading unit configured to read the test images printed by the test printing unit,
   wherein the second acquisition unit acquires the filter based on a reading result of the reading unit, and
   wherein the control unit is implemented by at least one processor and at least one memory.

4. The apparatus according to claim 1, wherein the scanning direction of the printhead crosses a conveyance direction of the printing medium.

5. The apparatus according to claim 1, further comprising:
   a third acquisition unit configured to acquire a printing condition of the printing unit; and
   a storage unit configured to store the filter and the printing condition acquired by the third acquisition unit in association with each other,
   wherein the third acquisition unit and the storage unit are implemented by at least one processor and at least one memory.

6. The apparatus according to claim 5, wherein the printing condition includes at least one of a distance between the printhead and the printing medium and a speed of a carriage on which the printhead is mounted.

7. The apparatus according to claim 1, wherein the processing unit executes the filter processing for brightness of the image data acquired by the acquisition unit.

8. The apparatus according to claim 1, wherein the filter is configured to compensate for degradation in the sharpness of the image that occurs when the image is printed by the printing unit.

9. The apparatus according to claim 8, wherein the filter comprises a filter configured to compensate for the degradation in the sharpness of the image in a frequency region lower than a spatial frequency determined in advance based on a visual characteristic.

10. The apparatus according to claim 1, wherein the image processing apparatus includes the printing unit.

11. The apparatus according to claim 1, wherein a size of the filter corresponding to the predetermined direction equals a size corresponding to the scanning direction.

12. The apparatus according to claim 1, wherein a degree of enhancing the sharpness of the image so as to change frequency characteristic by the filter processing under a frequency region corresponding to 4 cycles/mm is greater than a degree of enhancing the sharpness of the image so as to change frequency characteristic by the filter processing above a frequency region corresponding to 4 cycles/mm.

13. The apparatus according to claim 1, wherein the ink droplets discharged from at least one of the plurality of nozzles include a main droplet and a satellite.

14. A method executed in an image processing apparatus for processing image data used for printing by a printing unit configured to discharge ink droplets from a plurality of nozzles that are arranged in a predetermined direction of a printhead, thereby printing an image on a printing medium based on image data in a printing direction, intersecting with the predetermined direction, that is a scanning direction of the printhead, comprising:
  acquiring the image data;
  processing to change, by filter processing, a pixel value of the acquired image data using a filter configured to enhance sharpness of the image; and
  outputting the processed image data as data used for printing by the printhead,
  wherein a degree of compensation for the degradation in the image by the filter depends on the printing direction, and
  wherein a degree of enhancing the sharpness of the image, by the filter processing so as to change frequency characteristics, is greater in the scanning direction than in the predetermined direction.

15. The method according to claim 14, wherein the scanning direction of the printhead crosses a conveyance direction of the printing medium.

16. The method according to claim 14, further comprising:
  acquiring a printing condition of the printing unit; and
  storing the filter and the acquired printing condition in association with each other.

17. The method according to claim 14, wherein the filter is configured to compensate for degradation in the sharpness of the image that occurs when the image is printed by the printing unit.

18. The apparatus according to claim 17, wherein the filter comprises a filter configured to compensate for the degradation in the sharpness of the image in a frequency region lower than a spatial frequency determined in advance based on a visual characteristic.

19. The apparatus according to claim 14, wherein the image processing apparatus includes the printing unit.

20. A non-transitory computer-readable storage medium storing a program that, to process image data used for printing by a printing unit configured to discharge ink droplets from a plurality of nozzles that are arranged in a predetermined direction of a printhead, thereby printing an image on a printing medium based on image data in a printing direction, intersecting with the predetermined direction, that is a scanning direction of the printhead, causes a computer to perform steps comprising:
  acquiring the image data; and
  processing to change, by filter processing, a pixel value of the acquired image data, using a filter configured to enhance sharpness of the image; and
  outputting the processed image data as data used for printing by the printhead,
  wherein a degree of compensation for the degradation in the image by the filter depends on the printing direction, and
  wherein a degree of enhancing the sharpness of the image, by the filter processing so as to change frequency characteristics, is greater in the scanning direction than in the predetermined direction.

21. An image processing apparatus for processing image data used for printing by a printing unit configured to discharge ink droplets from a printhead, thereby printing an image on a printing medium based on image data in a printing direction that is a scanning direction of the printhead, comprising:
  an acquisition unit configured to acquire the image data; and
  a processing unit configured to process the image data acquired by the acquisition unit using a filter configured to compensate for degradation in the image that occurs when the image is printed,
  wherein a degree of compensation for the degradation in the image by the filter depends on the printing direction,
  wherein a degree of compensation for the degradation in the image by the filter in the scanning direction of the printhead is greater than a degree of compensation for the degradation in the image by the filter in a direction crossing the scanning direction, and
  wherein in a case in which the scanning direction of the printhead crosses a conveyance direction of the printing medium, the degree of compensation for the degradation in the image by the filter changes between the scanning direction of the printhead and the conveyance direction of the printing medium.

22. An image processing apparatus for processing image data used for printing by a printing unit configured to discharge ink droplets from a printhead, thereby printing an image on a printing medium based on image data in a printing direction that is a scanning direction of the printhead, comprising:
  an acquisition unit configured to acquire the image data; and
  a processing unit configured to process the image data acquired by the acquisition unit using a filter configured to compensate for degradation in the image that occurs when the image is printed,
  wherein a degree of compensation for the degradation in the image by the filter depends on the printing direction,
  wherein a degree of compensation for the degradation in the image by the filter in the scanning direction of the printhead is greater than a degree of compensation for the degradation in the image by the filter in a direction crossing the scanning direction, and
  wherein the degree of compensation for the degradation in the image by the filter in the scanning direction of the printhead is greater than a degree of compensation for the degradation in the image by the filter in a print width direction of the printing medium.

\* \* \* \* \*